United States Patent [19]
Scheibe et al.

[11] Patent Number: 5,938,225
[45] Date of Patent: Aug. 17, 1999

[54] MOTORCYCLE WITH ENHANCED STEERING ASSEMBLY

[75] Inventors: Steven Scheibe, Wales; Scott Brooks, Waukesha, both of Wis.

[73] Assignee: Harley-Davidson Motor Company, Milwaukee, Wis.

[21] Appl. No.: 08/805,827

[22] Filed: Feb. 26, 1997

[51] Int. Cl.$^6$ .................................................. B62K 11/14
[52] U.S. Cl. .......................................... 280/279; 384/619
[58] Field of Search .................................... 280/276, 279, 280/274; 384/613, 615, 619, 454

[56] References Cited

U.S. PATENT DOCUMENTS

| | | | |
|---|---|---|---|
| 1,993,809 | 3/1935 | Schnelle | 384/613 |
| 2,103,912 | 12/1937 | Montgomery | 384/613 |
| 3,765,787 | 10/1973 | Hart et al. | 384/613 |
| 3,866,946 | 2/1975 | Robison | 280/279 |
| 4,600,207 | 7/1986 | Zosi | 280/279 |
| 5,305,654 | 4/1994 | Durham | 280/279 |
| 5,409,359 | 4/1995 | Takano et al. | 384/615 |

*Primary Examiner*—Lanna Mai
*Assistant Examiner*—Avraham H. Lerner
*Attorney, Agent, or Firm*—Michael Best & Friedrich LLP

[57] ABSTRACT

A motorcycle including a frame having a head tube, a fork having a stem positioned within the head tube, and a bearing assembly operatively positioned between the stem and the head tube. The bearing assembly includes a double-row, radial-thrust bearing on one end of the head tube, and a non-thrust radial bearing on the other end of the head tube.

15 Claims, 1 Drawing Sheet

MOTORCYCLE WITH ENHANCED STEERING ASSEMBLY

FIELD OF THE INVENTION

The present invention generally relates to the field of motorcycles, and more specifically to motorcycle steering assemblies.

BACKGROUND OF THE INVENTION

In a vast majority of motorcycles, steering is accomplished by turning the front wheel relative to the rear wheel. The front wheel is rotatably mounted to a fork, and the fork is rotatably mounted to the frame of the motorcycle. More specifically, the fork includes a fork stem that is rotatably mounted within a head tube on the motorcycle frame. The stem extends all the way through the head tube, and rotation between the stem and the head tube is typically provided by a lower bearing assembly on a lower end of the head tube and an upper bearing assembly on an upper end of the head tube.

The lower bearing assembly commonly includes a radial-thrust bearing (e.g., ball or roller bearing) that prevents upward movement of the stem relative to the head tube. The upper bearing assembly commonly includes a radial-thrust bearing (e.g., ball or roller bearing) that prevents downward movement of the stem relative to the head tube. In this manner, the stem is secured for rotation within the head tube. With proper adjustment of the bearing assemblies, the stem is allowed to rotate smoothly within the head tube to provide a low steering effort (i.e., effort required to turn front wheel).

SUMMARY OF THE INVENTION

In extreme riding conditions, such as while racing, it has been discovered that the steering effort can increase during hard braking situations. This increase in steering effort is beyond what would be expected from the increased braking loads alone. One theory for this phenomenon is that the increased loads encountered by the fork during hard braking cause elastic bending of the stem. Bending of the stem results in a shortening of the effective axial length of the stem. Since the upper and lower bearings restrict axial movement of the stem, the result is an increase in the loads within the bearings and an increase in the resistive torque between the stem and the head tube. The resistive torque can act to mask the steering feedback provided to the rider under extreme cornering conditions. Furthermore, the resistive torque increases the force that the rider must overcome to initiate steering of the motorcycle.

The present invention alleviates the above-noted problem by providing a motorcycle comprising a frame including a head tube having a tube length, a fork having a stem positioned within the head tube and rotatable relative to the head tube about an axis, and a bearing assembly operatively positioned between the stem and the head tube. The bearing assembly includes a first bearing for resisting upward axial movement of the stem relative to the head tube, and a second bearing for resisting downward axial movement of the stem relative to the head tube. The first and second bearings are spaced from each other by a distance less than half the tube length, and preferably less than one fourth the tube length. For example, the first and second bearings can be positioned adjacent each other, and preferably collectively comprise a double-row, radial-thrust bearing. If desired, the motorcycle can also include a non-thrust bearing (e.g., a radial bearing) positioned in spaced relation to the first and second bearings.

In another aspect, the present invention provides a motorcycle comprising a frame including a head tube, a fork having a stem positioned within the head tube, and a bearing assembly operatively positioned between the stem and the head tube. The bearing assembly includes a thrust bearing (e.g., a double-row, radial-thrust bearing) and a non-thrust bearing (e.g., a radial bearing) positioned in spaced relation to the thrust bearing. The thrust bearing can be designed to resist both upward and downward axial movement of the stem relative to the head tube. Preferably, the thrust bearing is positioned adjacent one end of the head tube, and the non-thrust bearing is positioned adjacent the other end of the head tube.

In another aspect, the present invention provides a motorcycle comprising a frame including a head tube having first and second ends, a fork having a stem positioned within the head tube and rotatable relative to the head tube about an axis that defines axial directions. The stem is axially movable relative to the first end of the head tube and is axially restrained relative to the second end of the head tube. Preferably, the stem is radially restrained relative to both the first and second ends of the head tube.

DETAILED DESCRIPTION

Figure 1:
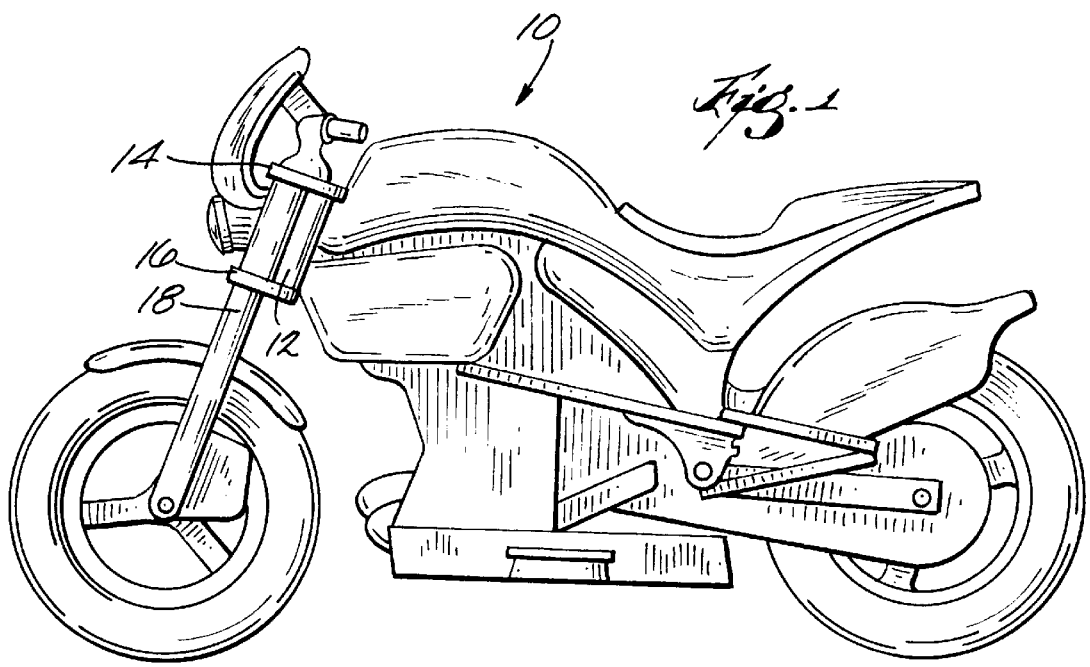
FIG. 1 is a side view of a motorcycle embodying the present invention.
Figure 2:
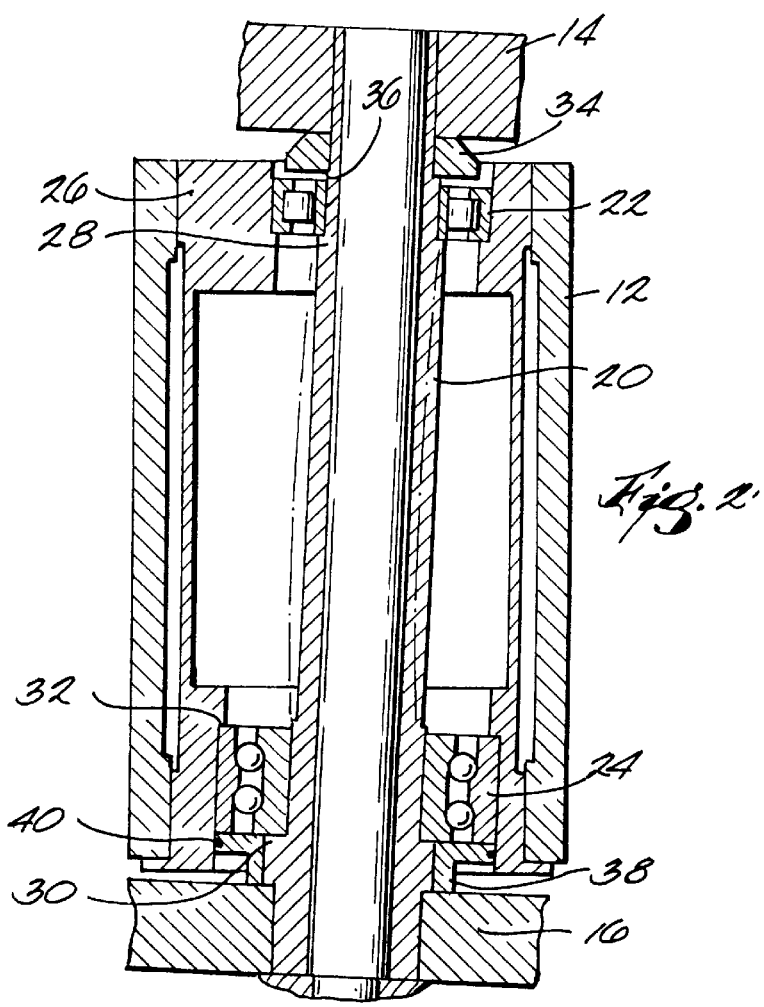
FIG. 2 is a side section view of the head tube and steering stem of the motorcycle of FIG. 1.

The illustrated motorcycle 10 includes a head tube 12, an upper triple clamp 14, a lower triple clamp 16, and fork tubes 18 secured to the upper and lower triple clamps. Referring to FIG. 2, a steering stem 20 extends between and is secured to each of the upper and lower triple clamps.

In accordance with the present invention, a radial bearing 22 and a radial-thrust bearing 24 are operatively positioned between the stem 20 and the head tube 12. The bearings are pressed within a steering insert 26 that is secured within the head tube 12.

The radial bearing 22 is a roller bearing and is seated on an intermediate shoulder 28 of the stem 20. The radial bearing 22 and stem 20 are dimensioned such that the stem 20 can slide axially relative to the radial bearing 22. That is, the radial bearing 22 acts as a non-thrust bearing.

The radial-thrust bearing 24 is seated between a lower shoulder 30 on the stem 20 and an inner shoulder 32 in the steering insert 26. In the illustrated embodiment, the radial-thrust bearing 24 is a double-row, radial-thrust bearing 24. In this manner, the radial-thrust ball bearing essentially acts as two bearings: one that resists upward axial movement of the stem 20 relative to the head tube 12 and another that resists downward axial movement of the stem 20 relative to the head tube 12.

A spacer 34 is positioned between the upper triple clamp 14 and the radial bearing 22 to prevent excessive downward movement of the stem 20 relative to the head tube 12. The spacer 34 is seated on an upper shoulder 36 of the stem 20 and is spaced from the upper surface of the radial bearing 22 by a distance of about 0.020 inches (0.5 mm).

A lower seal 38 is provided at the lower end of the radial-thrust bearing 24 to inhibit entry of contaminants into the radial-thrust bearing 24. The lower seal 38 is substantially L-shaped in cross-section and includes an O-ring 40 around its outer periphery to provide an enhanced seal.

Assembly of the steering mechanism is initiated by inserting the steering insert 26 into the head tube 12. The radial bearing 22 and the radial-thrust bearing 24 are then pressed into the steering insert 26. Next, the stem 20 is secured to the lower triple clamp 16, and the lower seal 38 is positioned over the stem 20. The stem 20 is then inserted into the bottom of the head tube 12 until the bearings are properly seated on the stem 20. The spacer 34 is then positioned over the upper end of the stem 20, and the upper triple clamp 14 is secured to the upper end of the stem 20. If necessary, the head tube 12 can be provided with a clamping mechanism on both its upper end and its lower end so that the various components can be clamped within the head tube 12.

It should be appreciated that, while not specifically shown in the drawings, the head tube 12, steering stem 20, radial bearing 22, radial-thrust bearing 24, and steering insert 26 that are illustrated in the drawings are generally circular in cross section.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle comprising:

a frame including a head tube having a tube length;

a fork having a stem positioned within said head tube and rotatable relative to said head tube about an axis, said axis defining upward and downward axial directions;

a bearing assembly operatively positioned between said stem and said head tube, said bearing assembly including:

a first bearing for resisting upward axial movement of said stem relative to said head tube; and a second bearing for resisting downward axial movement of said stem relative to said head tube; and a non-thrust bearing positioned in spaced relation to said first and second bearings;

wherein said first and second bearings are spaced from each other by a distance less than half the tube length; and wherein said stem is axially movable relative to said non-thrust bearing.

2. A motorcycle as claimed in claim 1, wherein said first and second bearings are spaced from each other by a distance less than one fourth the tube length.

3. A motorcycle as claimed in claim 2, wherein said first and second bearings are positioned adjacent to each other.

4. A motorcycle as claimed in claim 1, wherein said first and second bearings each comprise a ball bearing.

5. A motorcycle as claimed in claim 1, wherein said non-thrust bearing comprises a roller bearing.

6. A motorcycle comprising:

a frame including a head tube;

a fork having a stem positioned within said head tube; and a bearing assembly operatively positioned between said stem and said head tube, said bearing assembly including:

a thrust bearing; and a non-thrust bearing positioned in spaced relation to said thrust bearing;

wherein said stem is rotatable relative to said head tube about an axis, wherein said axis defines axial directions, and wherein said stem is axially movable relative to said non-thrust bearing.

7. A motorcycle as claimed in claim 6, wherein said head tube includes two opposed ends, and wherein said thrust bearing is positioned adjacent one of said ends of said head tube, and wherein said non-thrust bearing is positioned adjacent the other of said ends of said head tube.

8. A motorcycle as claimed in claim 6, wherein said stem is rotatable relative to said head tube about an axis, wherein said axis defines upward and downward axial directions, and wherein said thrust bearing resists both upward and downward axial movement of said stem relative to said head tube.

9. A motorcycle as claimed in claim 6, wherein said thrust bearing comprises a radial-thrust bearing.

10. A motorcycle as claimed in claim 6, wherein said thrust bearing comprises a ball bearing.

11. A motorcycle as claimed in claim 6, wherein said non-thrust bearing comprises a radial bearing.

12. A motorcycle as claimed in claim 6, wherein said non-thrust bearing comprises a roller bearing.

13. A motorcycle comprising:

a frame including a head tube having first and second ends;

a fork having a stem positioned within said head tube and rotatable relative to said head tube about an axis, said axis defining axial directions, wherein said stem is axially movable relative to said first end of said head tube and is axially restrained relative to said second end of said head tube.

14. A motorcycle as claimed in claim 13, wherein said stem is radially restrained relative to both said first and second ends of said head tube.

15. A motorcycle as claimed in claim 13, wherein said first end comprises an upper end of said head tube, and wherein said second end comprises a lower end of said head tube.

* * * * *